United States Patent Office 3,449,236
Patented June 10, 1969

3,449,236
DEWAXING AID COMPOSITION
John E. Engelhart, Westfield, N.J., assignor to Esso Research and Engineering Company, a corporation of Delaware
No Drawing. Filed Apr. 27, 1966, Ser. No. 545,550
Int. Cl. C10m 3/16; C10g 43/08
U.S. Cl. 208—28                                          9 Claims

ABSTRACT OF THE DISCLOSURE

This invention relates to a novel wax crystal modifier composition and to the utilization thereof. More particularly, it pertains to a dewaxing aid comprising an esterified, amidated or imidated polymer of maleic anhydride or derivatives thereof with nonconjugated diolefins.

---

Various methods are known in the art for separating wax from petroleum oil. One such method, for instance, is chilling the waxy oil and filtering off the solid wax. One of the most popular ways of dewaxing oils is known as solvent dewaxing. This comprises diluting the oil with a solvent, heating until complete solution is obtained, and then chilling until the desired amount of wax has crystallized out. The wax crystals thus formed are separated from the slurry by means of filtration. The wax is then further purified, while the solvent is recovered for reuse and the dewaxed oil is sent to other refinery processes.

Although such solvent dewaxing has largely replaced other processes for the separation of wax from hydrocarbon oils, filtration of the wax crystals from the slurry formed during dewaxing is difficult and often the filtration rate of the slurry limits the capacity of the entire process. The slurry filtration rate is determined primarily by the size and shape of the wax crystals formed during the chilling step of the process. Very fine crystals tend to clog the filter media rapidly, reducing the filtration rate and eventually necessitating shutdown of the filters for removal of the accumulated wax. Very large crystals tend to form gel-like interlocking masses which do not form a compact filtered cake, which contain large amounts of oil and solvent, and which are difficult to wash. As a solution to this problem, it has become the practice in the art to incorporate in the wax-containing petroleum oil, materials which modify the size and shape of wax crystals in such a manner as to permit more rapid separation of the wax during dewaxing operations. These materials are known as dewaxing aids. For example, it has been known for some time that condensation products of chlorinated wax and naphthalene are efficient dewaxing aids for wax-containing petroleum oils. However, the continued need for more efficient petroleum dewaxing processes has raised the requirements of dewaxing and filtering aids. The provision of new and more efficient dewaxing aids is, therefore, of great importance to the petroleum refining art.

It is accordingly, an object of the persent invention to provide a novel dewaxing aid composition.

It is a further object to provide a method for substantially improving the filtration of waxes from petroleum oils.

Other objects and advantages of the instant invention will become apparent upon a further reading of the following description thereof.

The present invention is predicated on the discovery that the separation of wax from a petroleum oil in a conventional dewaxing process can be substantially improved by incorporating into the oil, prior to dewaxing operations, a polymer of maleic anhydride or a derivative thereof with a nonconjugated diolefin. Particularly effective dewaxing aids include those polymers which have been esterified, amidated or imidated.

In general, the maleic anhydride and the derivatives thereof which are employed in this invention may be represented by the following generic formula:

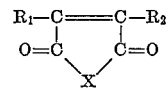

wherein $R_1$ and $R_2$ are hydrogen, chlorine, bromine, or a lower alkyl (e.g. a $C_1$–$C_4$ alkyl, such as, methyl, ethyl, butyl) and X is oxygen, NH or $NR_3$, wherein $R_3$ is a $C_1$–$C_{30}$ alkyl. Specific examples of suitable maleic anhydride derivatives include methylmaleic anhydride, dimethylmaleic anhydride, ethylmaleic anhydride, N-ethyl maleimide, N-hexyl maleimide, N-dodecyl maleimide, N-tetradecyl maleimide, N-eicosyl maleimide, N-tetracosyl maleimide, chloromaleic anhydride, dichloromaleic anhydride, bromomaleic anhydride and the like.

The diolefins which are useful for polymerization with maleic anhydride or the aforedescribed derivatives thereof include the bicyclic, alicyclic or aliphatic nonconjugated diolefins containing from about 6 to about 28 carbon atoms, preferably from about 6 to 12 carbon atoms. Nonlimiting examples of suitable monomers include 1,5-cyclooctadiene, methylene norbornene, 1,5-hexadiene, dicyclopentadiene, 5-vinyl-2-norbornene, 1,5-cyclodecadiene, 2,4 - dimethyl - 2,7 - octadiene, 3(2 - methyl - 1-propenyl) cyclopentene, 1,5-octadecadiene, and the like.

The agent used for esterification may be a hydroxy-containing compound, e.g., a linear branched or cyclic alcohol, containing from about 12 to about 30 carbon atoms. Preferred, however, are the aliphatic, substantially linear monohydric alcohols having from about 18 to about 26 carbon atoms. Nonlimiting examples of useful alcohols include decanol, dodecanol, tetradecanol, $C_{16}$ oxo alcohol, octadecyl alcohol, eicosanol, $C_{22}$ oxo alcohol, tetracosanol, octocosanol, and commercial mixed alcohols, e.g., "Lorol," tallow alcohol and similar natural products which have carbon chain lengths within the range recited above.

The amidation agents may be the acyclic or cyclic, primary and secondary mono and polyamines containing from 12 to about 30 carbon atoms, preferably from 18 to 26 carbon atoms. Particularly desirable results are obtained by the utilization of the substantially linear primary amines. Nonlimiting examples of such amines include 1-dodecylamine; 1-octadecylamine; 1-docosylamine; 2-tetracosylamine; 1,18 - octadecyldiamine; tetraethylenepentamine; N-octadecenyltrimethylenediamine; 1-octadecylmethylamine; 1-docosylethylamine; and the like. The imidation agents which may be used include the aforementioned primary amines.

The polymers of this invention include those oil-soluble materials having number average molecular weights of from about 1000 to about 50,000, preferably from 2000 to 20,000 and cointaining approximately equimolar amounts of the monomers.

While the dewaxing aids of the instant invention may be utilized to separate wax from a number of petroleum feedstocks such as residua, middle distillates and the like, it has special application to waxy lubricating oil fractions. These fractions generally range in boiling points from about 400° F. to about 1000° F. and contain from about 10 to about 25 wt. percent wax.

Polymerization catalysts may or may not be used for the preparation of the dewaxing aids. In general, any of the conventional free radial catalysts may be used, preferred however, are the peroxide catalysts. Among the useful catalysts are benzoyl peroxide, tert.-butyl hydroperoxide, di-tert.-butyl peroxide, cumene peroxide and the like. The catalyst, where used, may vary in concentration from about 0.1 to about 4.0% by weight based on the reactants.

In preparing the dewaxing aid of the present invention, the monomers are reacted in molar ratios ranging from about 0.1 to about 1 mole of maleic anhydride or derivatives thereof per mole of diolefin and are preferably employed in equimolar amounts. Polymerization is effected by conventional methods. For example, the monomeric materials and catalyst, where used, are generally charged into a flask with or without a solvent and are heated to a temperature at which the catalyst utilized has an appreciable rate of decomposition (e.g., 60–150° C.) for a period of a few minutes to several hours or more. Typical solvents include, for example, xylene, benzene, toluene, n-heptane and the like. Alternately, the copolymerization can be effected by thermal initiation with or without the presence of a solvent. In general, temperatures above about 250° F. have been found to thermally initiate the polymerization of the aforedescribed monomers.

Esterification, amidation or imidation of the polymer may be effected by means well known in the art. For example, the esterification agent is generally added with a suitable solvent (e.g., benzene, toluene, heptane, and the like) and a catalyst such as sulfuric acid, phosphoric acid, hydrochloric acid, benzene sulfonic acid and p-toluene sulfonic acid. Water of esterification is removed as an azeotrope of the solvent. At the end of the reaction, the product is water washed until neutral and the solvents are removed by vacuum distillation.

Esterification, amidation or imidation may result in partial or complete modification of the reactive groups, but it is preferred that the reaction be essentially complete. However, in some instances esterification, amidation or imidation of the polymer may be unnecessary. For example, it is understood that polymers of $C_{18}$–$C_{26}$ alkyl maleimides with the aforedescribed nonconjugated diolefins would be effective dewaxing aids per se and would not necessarily require modification by esterification, amidation or imidation The separation of wax from petroleum oils may be substantially improved by incorporating into said oil from about 0.005 to about 2 wt. percent (based on weight of wax-containing oil) of the dewaxing aids of the instant invention. Based on economic considerations, however, from about 0.02 to 0.2 wt. percent of the dewaxing aid is preferably employed.

In addition to the aforedescribed dewaxing aid, a dewaxing solvent may also be incorporated into the oil to facilitate wax separation. In general, from about 25 to about 80 wt. percent (based on weight of wax-containing oil) of a conventional dewaxing solvent may be used. Non-limiting examples of suitable solvents include benzene, toluene, acetate, methyl ethyl ketone, propane, hexane, ethylene dichloride, aliphatic alcohols, naphtha and mixtures thereof.

Various methods may be used to effect the blending of the dewaxing aid, the wax-containing oil, and the dewaxing solvent, where used. For example, the dewaxing aid and the wax-containing petroleum oil may be combined prior to the addition of a dewaxing solvent or alternately, the dewaxing solvent can be admixed with the oil prior to the addition of a dewaxing aid. Broadly, an admixing temperature of about 50° F. to about 250° F. is used. It is preferred, however, that the temperature be from about 100° F. to about 150° F. Temperatures in excess of 250° F. should be avoided for any prolonged time in order to minimize any possible thermodegradation of the dewaxing aid.

Particularly desirable results are obtained when the dewaxing aids of the instant invention are utilized in the conventional solvent dewaxing processes. For example, admixtures of the aforedescribed dewaxing aid, dewaxing solvent and wax-containing oil may be processed by chilling the said admixture in any suitable manner to a wax precipitation temperature. The precipitated wax may then be removed by centrifugation or filtration, preferably the latter. Dewaxing operations are preferably conducted at a temperature within the range of about −30° F. to about +20° F. and, more preferably, at a temperature within the range of about −10° F. to about +5° F. Wax deoiling or wax fractionation operations are preferably conducted at a temperature within the range of about 0° to about 120° F. which is higher than the dewaxing temperature employed. Thus, when dewaxing operations are conducted at a temperature of about −10° F. to about +5° F., it is preferable to conduct wax deoiling operations at a temperature within the range of about +10° F. to +20° F., depending upon the desired quality of deoiled wax.

The dewaxing aids of this invention are found compatible with other additive materials and may be blended successfully with petroleum oils containing minor amounts of viscosity index improvers, rust inhibitors, lubricity agents, oxidation inhibitors, and the like.

The invention can be more fully understood by reference to the following examples.

Example 1

A thermally initiated copolymer of 1,5-cyclooctadiene and maleic anhydride was prepared by reacting 108 grams (1 mole) of the diolefin with 49 grams (0.5 moles) of the anhydride at a temperature of about 150° C. for a period of about 20 hours. Upon completion of the reaction, unreacted 1,5-cyclooctadiene was removed by vacuum stripping at 150° C. for a period of about 6 hours. The residue, i.e., 80–90 grams, was a brown colored, brittle resin. To 50 grams of this residue was added 150 ml. of toluene, 144 grams of 1-eicosanol and 2.0 grams of p-toluene sulfonic acid monohydrate. The esterification was carried out to essentially theroertical completion at 240° F. by removing the water of reaction as an azeotrope with the toluene. The resulting reaction mixture was then washed with water until neutral. The solvent was removed by distillation and the product finally concentrated by heating to 100° C. at 1 mm. pressure. The product recovered was 175 grams of a light colored, brittle polymer having a molecular weight of about 3500, as measured by osmometry. The product was then blended in the respective amount hereinafter specified with an intermediate viscosity lube oil having the properties shown in Table I and hereinafter referred to as test oil.

TABLE I.—PROPERTIES OF TEST OIL [1]

Inspection:
| | |
|---|---|
| ASTM viscosity at 210° F., SUS | 52.0 |
| Boiling point range, ° F. | 400–900 |
| Flash point, ° F., COC | 460 |
| ASTM pour point, ° F. | 120+ |
| Wax content, wt. percent | 19 |

[1] Intermediate viscosity lube oil from Mid-Continent crude.

Example 2

The test oil was dewaxed by diluting with a solvent consisting of 57 wt. percent methyl ethyl ketone and 43 wt. percent toluene at a solvent/oil ratio of 3.5/1 and then chilling at the rate of 3° F. per minute from a feed temperature of 140° F. to a filter temperature of −10° F. The chilled mixture was then continuously filtered through a refrigerated circular leaf filter at a pressure differential of 25 inches of mercury. The filtration cycle consisted of a filtration time of 33 seconds, a drying time of 10 seconds, a wash time of 22 seconds, and a second drying time of 17 seconds.

The test oil was also dewaxed in the same manner as above except that 0.05 wt. percent (based on weight of wax-containing oil) of the dewaxing aid prepared in Example 1 was added to the oil sample prior to chilling, i.e., the oil, solvent and dewaxing aid were admixed at a temperature of about 150° F. The feed mixture comprising the dewaxing aid of Example 1 was then processed under the same dewaxing conditions as used in the first operation wherein no dewaxing aid was employed.

The data obtained from the above respective dewaxing operations were as shown in Table II.

TABLE II.—DEWAXING AND INTERMEDIATE VISCOSITY LUBE [1]

| Dewaxing aid used | Filtration rate, gal./hr. ft.[2] | Oil yield, percent |
|---|---|---|
| None | 22 | 64 |
| 0.05 wt. percent of Example 1 | 41 | 82 |

[1] Test oil of Table I.

From the data in Table II, the marked superiority secured in a dewaxing operation by the use of a dewaxing aid of the instant invention is readily apparent. Thus, the use of the dewaxing aid has resulted in almost a doubling of the oil filtration rate and, in addition, has increased the yield of dewaxed oil more than 25%.

Example 3

An effective dewaxing aid is also prepared, for example, by the reaction of one mole of nonconjugated 1,5-hexadiene with one mole of citraconic anhydride under conditions similar to those employed in Example 1. The polymeric product is amidated by reaction with the theoretical amount of 1-docosylamine. The resulting product is a dewaxing aid for a conventional dewaxing process.

It is not intended to restrict the present invention to the foregoing examples, but rather it should be only limited by the appended claims.

What is claimed is:

1. A composition comprising a major proportion of a wax-containing oil and from about 0.005 to about 2.0 wt. percent of a dewaxing aid having a number average molecular weight within the range of about 1,000 to 50,000 wherein said dewaxing aid comprises the organic reaction product of (a) an oil-soluble copolymer of a compound of the formula:

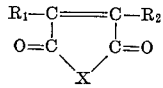

wherein $R_1$ and $R_2$ are selected from the group consisting of H, Cl, Br and a lower alkyl; X is selected from the group consisting of O, NH and $NR_3$, wherein $R_3$ is a $C_1$–$C_{30}$ alkyl; with a $C_6$–$C_{12}$ nonconjugated cyclic diolefin and (b) a $C_{12}$–$C_{30}$ compound selected from the group consisting of an aliphatic monohydric alcohol, an amine and mixtures thereof.

2. A composition according to claim 1 wherein $R_1$ and $R_2$ are hydrogen and wherein X is oxygen.

3. A composition according to claim 2 wherein said alcohol and said amine contain from about 18 to about 26 carbon atoms.

4. A composition according to claim 1 wherein said nonconjugated diolefin is 1,5-cyclooctadiene.

5. A composition comprising a major proportion of a wax-containing oil and about 0.005 to about 2.0 wt. percent of a dewaxing aid, wherein said dewaxing aid comprises a copolymer having a number average molecular weight within the range of about 1,000 to 50,000 of a $C_{12}$–$C_{30}$ alkyl maleimide with a $C_6$–$C_{12}$ nonconjugated cyclic diolefin.

6. A composition according to claim 5 wherein said dewaxing aid comprises a polymer of $C_{18}$–$C_{24}$ alkyl maleimide with 1,5-cyclooctadiene.

7. In the process for the separation of wax from petroleum oils by the steps which include chilling the oil to form solid wax crystals and removing said wax crystals; the improvement of incorporating into said oil prior to formation of said wax crystals, 0.005 to about 2 wt. percent of a dewaxing aid having a number average molecular weight within the range of about 1,000 to 50,000 comprising the organic reaction product of (a) an oil-soluble copolymer of a compound of the formula:

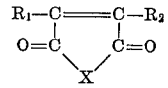

wherein $R_1$ and $R_2$ are selected from the group consisting of H, Cl, Br and a lower alkyl; X is selected from the group consisting of O, NH and $NR_3$, wherein $R_3$ is a $C_1$–$C_{30}$ alkyl; with a $C_6$–$C_{12}$ nonconjugated cyclic diolefin and (b) a $C_{12}$–$C_{30}$ compound selected from the group consisting of an aliphatic monohydric alcohol, an amine and mixtures thereof.

8. A process according to claim 7, wherein $R_1$ and $R_2$ are hydrogen, wherein X is oxygen, and wherein said alcohol and said amine contain from about 18 to about 26 carbon atoms.

9. A process according to claim 7 wherein said dewaxing aid comprises a polymer of a $C_{12}$–$C_{30}$ alkyl maleimide with a $C_6$–$C_{12}$ nonconjugated cyclic diolefin.

References Cited

UNITED STATES PATENTS 2,615,845 10/1952 Lippincott et al. _____ 252—56
3,239,445 3/1966 Leonard et al. _____ 208—33

DANIEL E. WYMAN, *Primary Examiner.*

P. E. KONOPKA, *Assistant Examiner.*

U.S. Cl. X.R.

44—62; 208—31, 33; 252—51.5, 56; 260—78.4, 78.5